United States Patent [19]

Kim

[11] Patent Number: 5,886,424
[45] Date of Patent: Mar. 23, 1999

[54] POWER SUPPLY APPARATUS FOR PORTABLE COMPUTER AND DC INPUT SELECTION CIRCUIT ADAPTED TO THE SAME

[75] Inventor: Dong-Hwan Kim, Suwon, Rep. of Korea

[73] Assignee: SamSung Electronics Co., Ltd., Suwon, Rep. of Korea

[21] Appl. No.: 891,363

[22] Filed: Jul. 10, 1997

[30] Foreign Application Priority Data

Jul. 10, 1996 [KR] Rep. of Korea ................. 1996/27825

[51] Int. Cl.[6] .................................................. H05K 10/00
[52] U.S. Cl. .............................. 307/64; 307/23; 395/280; 395/281; 395/882
[58] Field of Search .................................. 307/64, 25, 26, 307/23, 6 B; 395/281, 280, 882; 301/86

[56] References Cited

U.S. PATENT DOCUMENTS

| | | |
|---|---|---|
| 5,414,751 | 5/1995 | Yamada . |
| 5,438,395 | 8/1995 | Morimura et al. . |
| 5,463,742 | 10/1995 | Kobayashi ............................. 395/281 |
| 5,555,491 | 9/1996 | Tao ........................................ 395/281 |
| 5,579,197 | 11/1996 | Mengelt et al. . |
| 5,579,489 | 11/1996 | Dornier et al. ....................... 395/281 |
| 5,603,095 | 2/1997 | Uola . |
| 5,608,612 | 3/1997 | Hokao . |
| 5,798,951 | 8/1998 | Cho et al. ............................. 395/281 |
| 5,805,412 | 9/1998 | Yanagisawa et al. ................. 395/280 |

Primary Examiner—Albert W. Paladini
Attorney, Agent, or Firm—Robert E. Bushnell, Esq.

[57] ABSTRACT

Disclosed is a power supply apparatus which permits a docking station to be operated with a battery power from a battery pack of a portable computer even if supply of AC power to the docking station is accidentally cut off. The apparatus for a portable computer system for use with a docking station having a logic circuit for expanding functions of the portable computer comprises a DC input selection circuit placed on the portable computer side, for switching between the first and second DC voltages to provide a switched DC voltage to the portable computer as well as the docking station, so that the docking station is operated with the second DC power source even though supply of AC power to the docking station is cut off.

21 Claims, 8 Drawing Sheets

POWER SUPPLY APPARATUS FOR PORTABLE COMPUTER AND DC INPUT SELECTION CIRCUIT ADAPTED TO THE SAME

CLAIM OF PRIORITY

This application makes reference to, incorporates the same herein, and claims all benefits accruing under 35 U.S.C. §119 arising from an application for a Power Supply Apparatus For Portable Computer and DC Input Selection Circuit Adapted to the Same earlier filed in the Korean Industrial Property Office on $10^{th}$ Jul. 1996 and there duly assigned Ser. No. 27825/1996.

1. Field of the Invention

The present invention relates to a power supply of a portable personal computer which is capable of using with a docking station to extend or enhance abilities and performance of the portable personal computer.

2. Description of the Related Art

U.S. Pat. No. 5,579,197 for a Backup Power System and Method to Mengelt et al and U.S. Pat. No. 5,608,612 for an Electronic Device Having a Fail Safe System For Memory Backup to Hijai each disclose battery backup systems for an electronic device should the alternating current input from a house power supply should fail. However, I have not seen battery backup devices used in notebook computer systems that attach to a docking station. Moreover, I have not seen a battery backup for a docking station of a notebook computer should the alternating current power supply fail.

SUMMARY OF THE INVENTION

It is an object of the present invention to provide a power supply apparatus which permits a docking station to be operated with a battery power from a battery pack of a portable computer even if supply of AC power to the docking station is accidentally cut off.

It is the other object of the present invention to provide a DC input selection circuit which is substantially adapted for a portable computer and which selects either one of DC voltages from a docking station and an AC adapter or a battery voltage from a battery pack to provide the selected voltage to logic circuits of a portable computer circuit and a docking station.

According to an aspect of the present invention, a power supply apparatus for a portable computer system for use with a docking station having a logic circuit for expanding functions of the portable computer, comprises first and second power input terminals placed on a portable computer side, for receiving first and second DC (direct current) voltage, respectively; a DC input selection circuit placed on the portable computer side, for switching between the first and second DC voltages to provide a switched DC voltage to the portable computer as well as the docking station; a first power converter placed on a docking station side, for converting an AC (alternating current) power voltage into a third DC voltage; and a second power converter placed on the docking station and connected with the first power input terminal, for converting either the third DC voltage from the first power converter or the switched DC voltage through the first power input terminal from the DC input selection circuit into plural levels of DC voltages necessary for the logic circuit of the docking station, whereby the docking station is operated with the second DC power source even though supply of AC power to the docking station is cut off. The second DC power source comprises a battery voltage from a battery pack.

In this embodiment, the DC input selection circuit comprises a switch for switching the second DC voltage to the portable computer as well as the docking station in response to a switch driving signal, a first voltage divider for dividing either the first DC voltage from the first power input terminal or the third DC voltage from the first power converter to generate a first divided voltage, a second voltage divider for dividing the second DC voltage from the second power input terminal to generate a second divided voltage, a comparator for comparing the first divided voltage with the second divided voltage to generate a comparison signal, and a driver for generating the switch driving signal in response to the comparison signal. The switched DC voltage from the DC input selection circuit is applied to a third power converter which is placed on the portable computer side and which is composed of a DC—DC converter for generating a multi-level voltage. Each of the first and second voltage dividers comprises two resistors which are connected in series with each other. The comparator comprises an operational amplifier. Thee switch is an electrical switch which comprises a transistor having first and second terminals connected with the second power input terminal and the DC—DC converter, respectively, and a control terminal for receiving the comparison signal from the comparator, and a diode connected between the first and second terminals of the transistor. The transistor comprises a P-channel FET (field effect transistor).

According to another aspect of the present invention, a power supply apparatus for a portable computer system for use with a docking station having a logic circuit for expanding functions of the portable computer, comprises a DC input selection circuit placed on a portable computer side, for switching between a first DC (direct current) voltage from a docking station side and a second DC voltage from a battery pack to provide a switched voltage to the portable computer, herein the DC input selection circuit provides the switched voltage to the docking station when supply of AC power to the docking station is cut off.

According to a further aspect of the present invention, a DC (direct current) input selection circuit has a first power input terminal for receiving a first DC voltage from either an AC (alternating current) adapter or a converter placed on a docking station; a second power input terminal for receiving a second DC voltage from a battery pack; a switch connected between the second power input terminal and the DC—DC converter, for switching the second DC voltage to the DC—DC converter in response to a switch driving signal; a first voltage divider for dividing the first DC voltage to generate a first divided voltage; a second voltage divider for dividing the second DC voltage to generate a second divided voltage; a comparator for comparing the first divided voltage with the second divided voltage to generate a comparison signal; and a driver for generating the switch driving signal in response to the comparison signal, whereby the second DC voltage is applied directly to the converter of the docking station as well as the portable computer when no DC voltage is generated from the AC adapter.

According to an additional aspect of the present invention, a DC (direct current) input selection circuit has a first power input terminal for receiving a first DC voltage from either an AC (alternating current) adapter or a converter placed on a docking station; a second power input terminal for receiving a second DC voltage from a battery pack, for switching between the first and second DC voltages so as to provide a switched voltage to a DC—DC converter placed on a portable computer side; a switch connected between the second power input terminal and the DC—DC converter, for switching the second DC voltage to the DC—DC converter in response to a switch driving signal; and a detector for detecting whether the first DC voltage of the first power input terminal is lowered less than the second DC voltage of the second power input terminal to generate the switch driving signal.

According to the power supply apparatus of the present invention, when supply of AC power is cut off, a battery voltage can be supplied through the DC input selection circuit to the docking station as well as the portable computer circuit. So the docking station can be normally operated with the battery voltage even though the supply of the AC power to the docking station is cut off.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
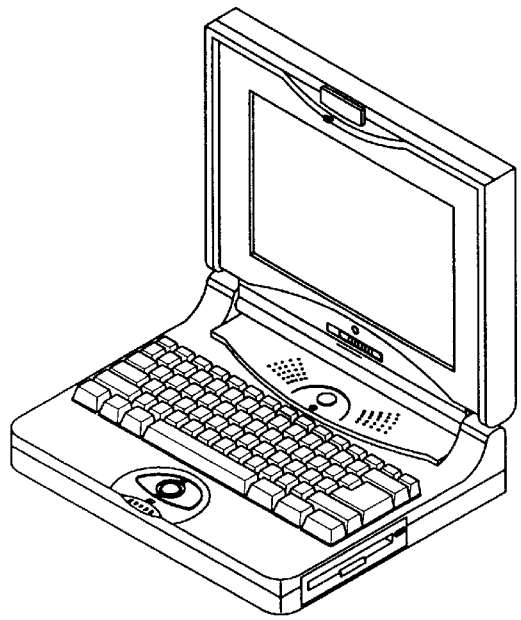
Fig. 1A is a perspective view of a portable computer of notebook type.

The abilities of a personal computer of notebook type shown in Fig. 1A are comparatively limited as compared with those of a personal computer of desktop type. A docking station is generally used for providing multimedia functions in a portable computer of notebook type so as to extend the abilities or enhanced performance of the portable computer.

Figure 1B:
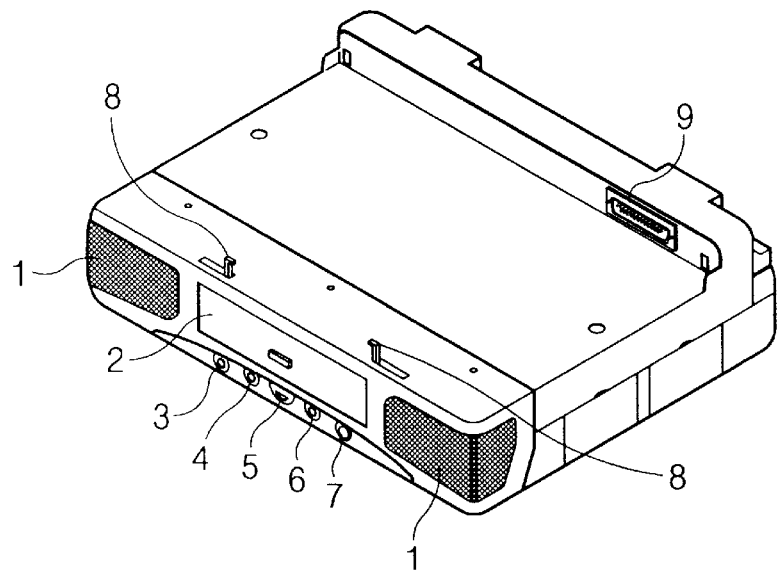
FIG. 1B is outer view of a docking station for use with the portable computer of Fig. 1A.
Figure 1C:
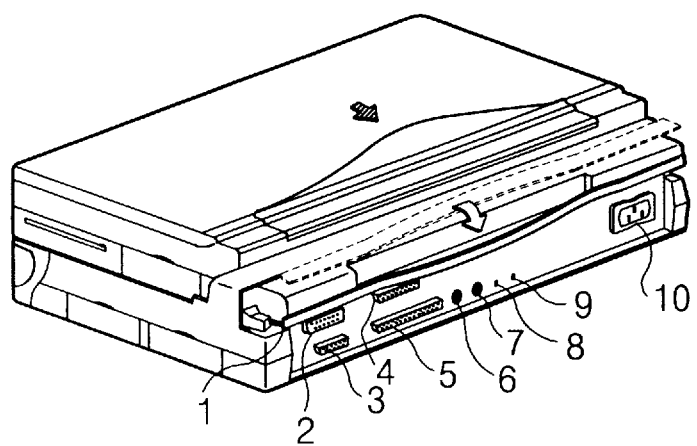
FIG. 1C is a perspective view showing the connection of the portable computer with the docking station.

Fig. 1B shows a docking station which makes it possible for a portable computer to record and play audio data. Such a docking station is provided with inner speakers 1, a CD-ROM drive 2, a headphone jack 3, a microphone jack 4, volume control buttons 5, LED for displaying the state of power on/off 6, a power switch 7, and latches 8 for mounting the docking station to the portable computer, as shown in FIG. 1C.

Figure 2:
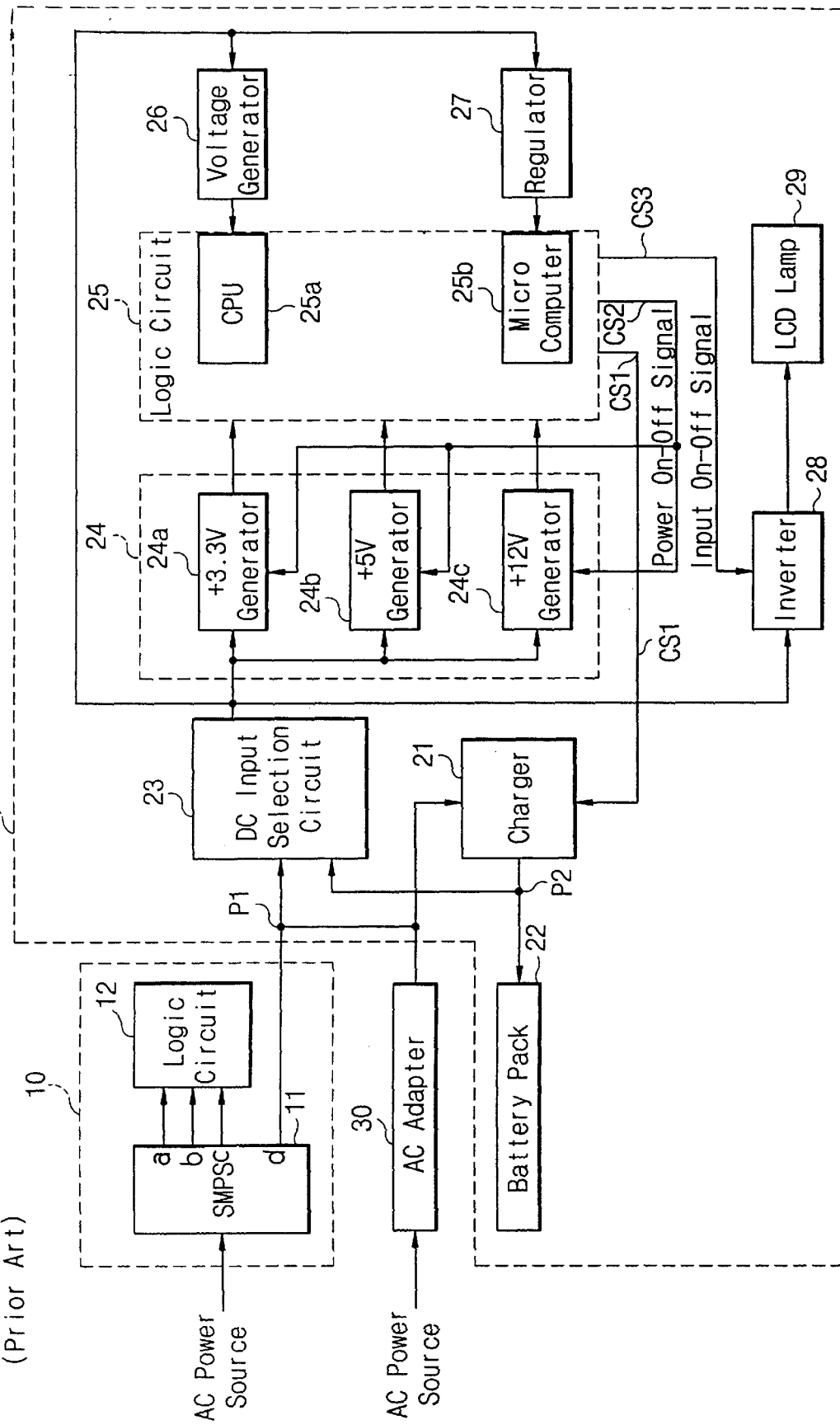
FIG. 2 is a circuit diagram of the conventional power supply for the portable computer which is mounted with the docking station.

FIG. 2 shows a conventional power supply circuit for a portable computer. The conventional power supply circuit has two main sections, a docking station circuit 10 and a computer circuit 20. In FIG. 2, reference numeral 30 is an AC adapter which converts an externally applied AC voltage into a DC voltage so as to supply the DC voltage to the portable computer. The docking station circuit 10 has a switching mode power supply (SMPS) 11 and a logic circuit 12. The SMPS 11 is provided to convert the AC voltage into a plurality of DC voltages, for example +3.3 V, +5 V, and +12 V, and to supply the converted DC voltages to the logic circuit 12 through respective output terminals a, b and c thereof. The SMPS 11 also produces a DC voltage having the same level as the output voltage of the AC adapter 30 to be supplied to the portable computer circuit 20 via another output terminal d thereof.

The portable computer circuit 20 has a DC input selection circuit 23 which receives two DC voltages from the AC adapter 30 and the battery 22 and provides them thereto, a DC—DC converter 24 which converts the DC voltage from the DC input selection circuit 23 into a plurality of voltages of different levels necessary for the operation of the portable computer, and a logic circuit 25 which has a CPU (Central Processing Unit) 25a, a microcomputer 25b and the like. This microcomputer 25b is provided to perform power management to maximize usability of the battery 22.

The DC—DC converter 24 is provided to drive the logic circuit 25, and has voltage generators 24a, 24b and 24c to produce a plurality of voltages whose levels are 3.3 V, 5 V, and 12 V The portable computer circuit 20 also has a charger 21 for charging the battery 22 with DC voltage from the AC adapter 30, a voltage generator 26 which converts the voltage from DC input selection circuit 23 into a certain input voltage necessary for the operation of the CPU 25a, and a regulator 27 for regulating the DC voltage from the DC input selection circuit 23 to power the microcomputer 25b.

The voltage generator 26 is adapted for the convenience of CPU upgrade. As the operation frequency of CPU is increased, the lower operating voltage is adapted in order to avoid heat problem of CPU. The DC voltage from the adapter 30 is preset more highly than the actual DC voltage from the completely charged battery 22 to charge the battery 22. The microcomputer 25b helps CPU manage the power consumption and enhance usability of battery 22. For example, during stand-by mode of the portable computer, the microcomputer 25b is able to cut-off electrical input power of the unused units such as a disk driver and DC—DC converter 24, etc. after performing backup process of the executing program.

Figure 3:
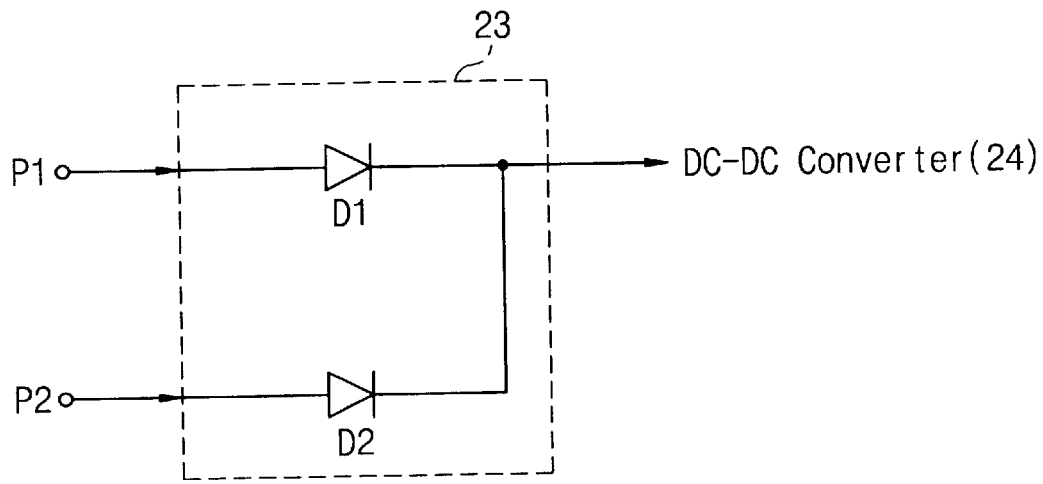
FIG. 3 is a detailed circuit diagram of the DC input selection circuit shown in FIG. 2.
Figure 4:
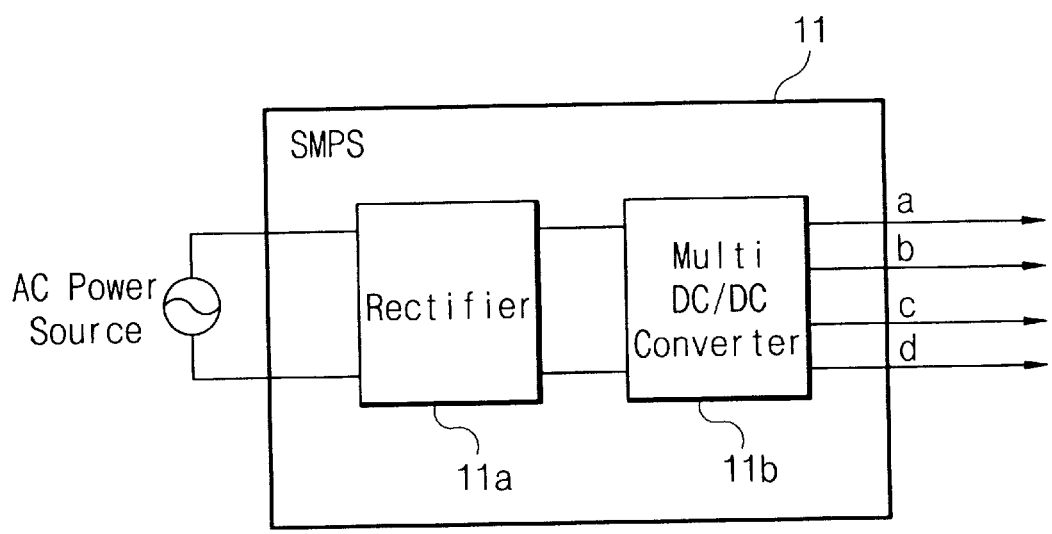
FIG. 4 is a detailed circuit diagram of the SMPS shown in FIG. 2.

As shown in FIG. 3, the DC input selection circuit 23 has two diodes D1 and D2 connected in parallel. Anodes of the diodes D 1 and D2 are connected with two input terminals P1 and P2, respectively. FIG. 4 shows the SMPS 11 which has a rectifier 1 a for rectifying AC voltage, and a DC—DC converter 11b for converting the rectified voltage into different levels of DC voltages.

In the above stated configuration of the convention power supply, if supply of AC power to the docking station is accidentally cut off, the battery voltage is supplied to the portable computer circuit 20, but not supplied to the docking station circuit 10. As a result, the computer can be still operated with the battery voltage, but the docking station cannot be operated. This is because the battery voltage is supplied only to the computer circuit 20. Consequently, the logic circuit of the docking station and the other circuits associated with the logic circuit 12 stop their operations.

Figure 5:
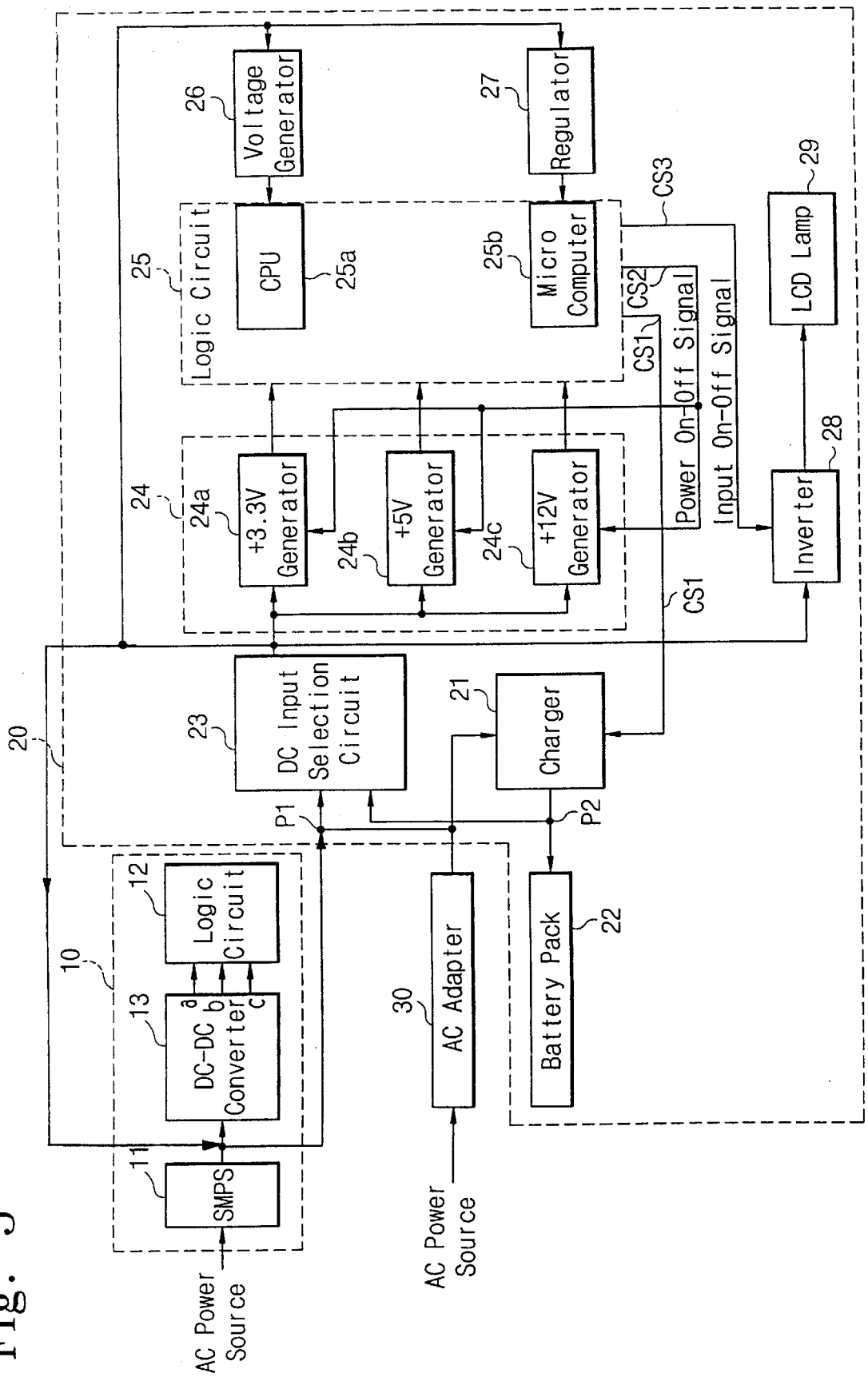
FIG. 5 is a circuit diagram of a novel power supply apparatus for a portable computer which is mounted with a docking station according to an embodiment of the present invention.

Referring to FIG. 5, a novel power supply apparatus in accordance with the present invention is adapted for a portable computer capable of using with a docking station which has a logic circuit 12 for expanding functions of the portable computer, and is made up of a switching mode power supply (SMPS) circuit 11 for converting AC voltage into DC voltage, a DC—DC converter 13 for converting the DC voltage from the SMPS circuit 11 or a battery voltage via a battery supply path into DC voltages of several levels which are necessary for the logic circuit 12 of the docking station. The battery voltage is also provided for the portable computer and applied from a battery 22 which is placed on the portable computer side. With this construction, even though supply of the AC voltage to the portable computer side and the docking station side is cut off, the docking station can be operated with the battery voltage applied through the battery supply path. Supply of the battery voltage along the battery supply path to the docking station is achieved by means of a DC input selection circuit 23. This DC input selection circuit 23 is provided to detect power cut-off such as power interruption or the like and then to form the battery supply path. If supply of AC power to the docking station is cut off, the DC input selection circuit 23 provides the battery voltage through the battery supply path to the docking station. Thus, even though supply of AC power is cut off, the docking station can be normally operated with the battery voltage.

Referring again to FIG. 5, the novel power supply apparatus has two main sections, one of which is a docking station circuit 10 placed on a docking station side, and the other of which is a portable computer circuit 20 placed on a portable computer side. AC adapter 30 is provided to supply electrical power to the portable computer circuit 20.

The docking station circuit 10 has a logic circuit 12 for performing docking station functions, an SMPS 11 for converting AC power voltage into DC voltage, and a DC—DC converter 13 for converting the DC voltage from the SMPS 11 or the adapter 30 into different levels of DC voltages. The DC voltages converted thus are provided to the logic circuit 12 for controlling the docking station functions. The DC—DC converter 13 can receive a battery voltage from a battery 22 via a DC input selection circuit 23, which is placed in the portable computer circuit 20, when supply of the AC power to the docking station is cut off. This operation will be described in detail below.

The SMPS 11 generates through an output terminal thereof the DC voltage having the same level as the output voltage of the AC adapter 30. The DC—DC converter 13 has output terminals a, b and c through each of which the plurality of voltages are provided to the logic circuit 12.

Also, the portable computer circuit 20 has DC input selection circuit 23 for switching between the DC voltage from the AC adapter 30 or SMPS 11 and the DC voltage (i.e. battery voltage) from the battery 22, DC—DC converter 24 which converts DC voltage from the DC input selection circuit 23 into three different voltages required for the operation of portable computer circuit 20, and logic circuit 25 which is made up of CPU 25a for processing data and a microcomputer 25b for management of electric power consumption. The DC—DC converter 24 has three converters 24a, 24b and 24c to produce a plurality of voltages whose levels are 3.3 V, 5 V, and 12 V.

The portable computer circuit 20 also has a charger 21 for charging the battery 22 with DC voltage from the AC adapter 30, a voltage generator 26 which converts the voltage from DC input selection circuit 23 into a certain input voltage necessary for the operation of the CPU 25a, and a regulator 27 for regulating input voltage of the microcomputer 25b. The charger 21 has two parts, one of which is a constant voltage generator for producing constant voltage and the other of which is a constant current generator for producing constant current.

Figure 6:
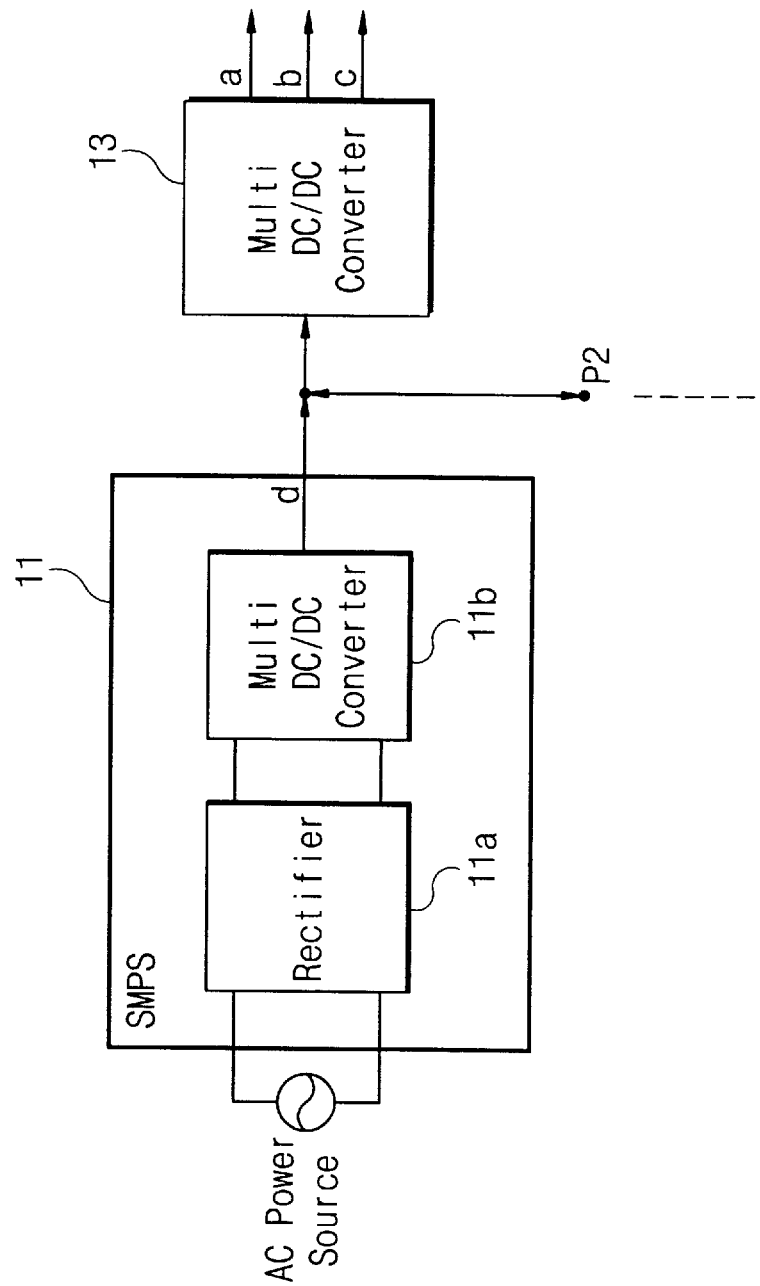
FIG. 6 is a detailed circuit diagram of the SMPS shown in FIG. 5.

The portable computer circuit 20 may also have LCD lamp 29 as a LCD backlight which is provided at the rear of LCD monitor. This LCD lamp 29 is powered by an inverter 28 for inverting the DC voltage from the DC—DC converter 23 into an AC voltage. The AC voltage from the inverter 28 is in the range of 400 V~500 V and has a frequency of about 20KHz~60KHz. The SMPS 11 has, as shown in FIG. 6, a rectifier 11a for rectifying AC voltage, and a DC—DC converter 11b for converting the rectified voltage into a certain DC voltage. The DC voltage converted thus is supplied to the DC—DC converter 13 so that the DC—DC converter 13 produces different levels of voltages and supplies them to the logic circuit 12 of the docking station side.

Figure 7:
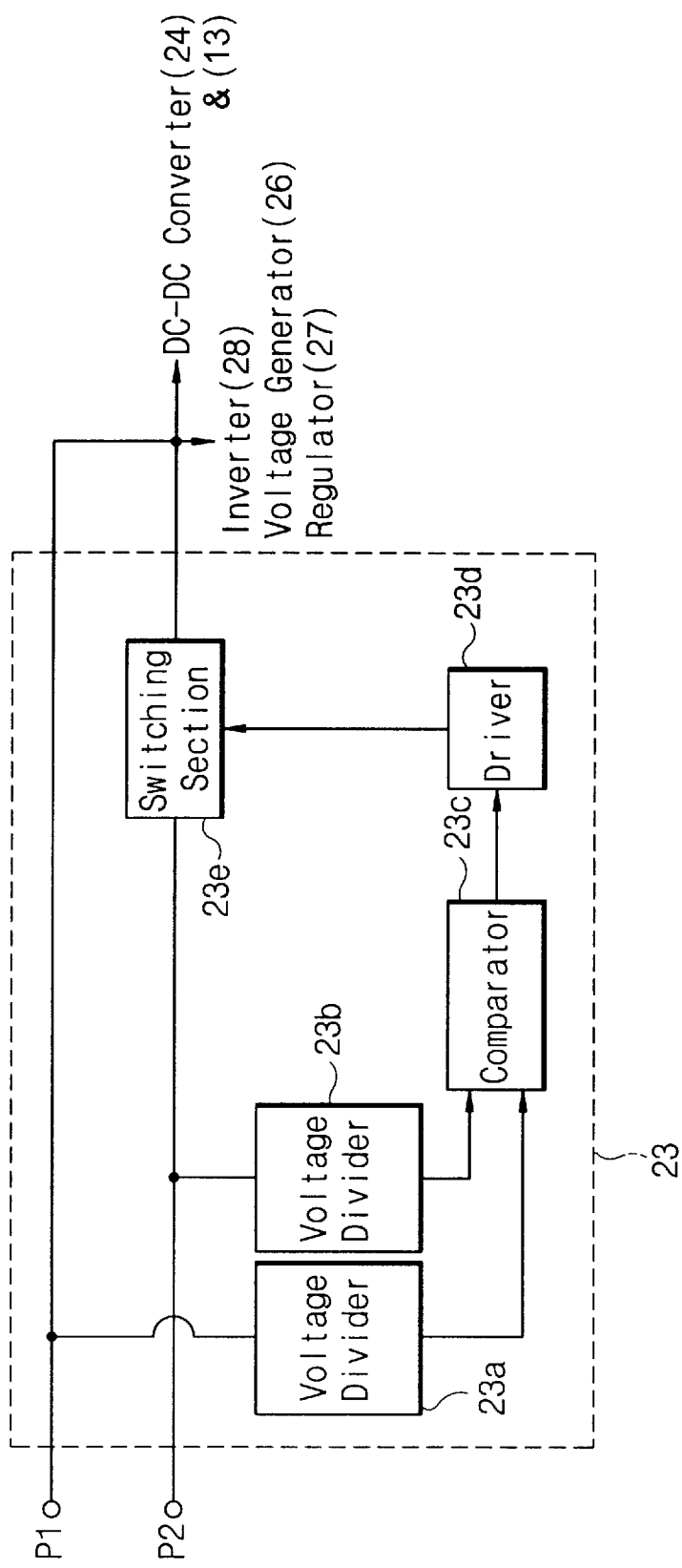
FIG. 7 is a block diagram of the DC input selection circuit shown in FIG. 5.

FIG. 7 shows the DC input selection circuit 23 according to the invention. In FIG. 7, terminal P1 is commonly connected to both output terminals of AC adapter 30 and SMPS 11. Terminal P2 is connected with the battery 22. The terminals PI and P2 are connected with two input terminals of the DC input selection circuit 23, respectively.

In this configuration, the portable computer has three paths for supplying electric power to the DC input selection circuit 23. One is that DC voltage from SMPS 11 is supplied to the DC input selection circuit 23 via the terminal P1. Another one is that DC voltage from the AC adapter 30 is supplied to the DC input selection circuit 23 via the terminal PI. The other one is that a battery voltage from the battery 22 is supplied to the DC input selection circuit 23 via the terminal P2.

The DC input selection circuit 23 makes the docking station be normally operated with the battery voltage from the battery 22, even in case that supply of AC power is accidentally or intentionally cut off. This is because the battery voltage is supplied via the DC input selection circuit 23 to the DC—DC converter 13 of the docking station. Referring again to FIG. 7, the DC input selection circuit 23 has an electrical switch 23e for switching the DC voltage applied via terminal P2 to the portable computer, a first voltage divider 23a for dividing the DC voltage applied via terminal P1 to generate a first divided voltage, a second voltage divider 23b for dividing the DC voltage applied via terminal P2 to generate a second divided voltage, a comparator 23c for comparing the first divided voltage with the second divided voltage and generating a comparison signal, and a driver 23d for driving the electrical switch 23e in response to the comparison signal.

Figure 8:
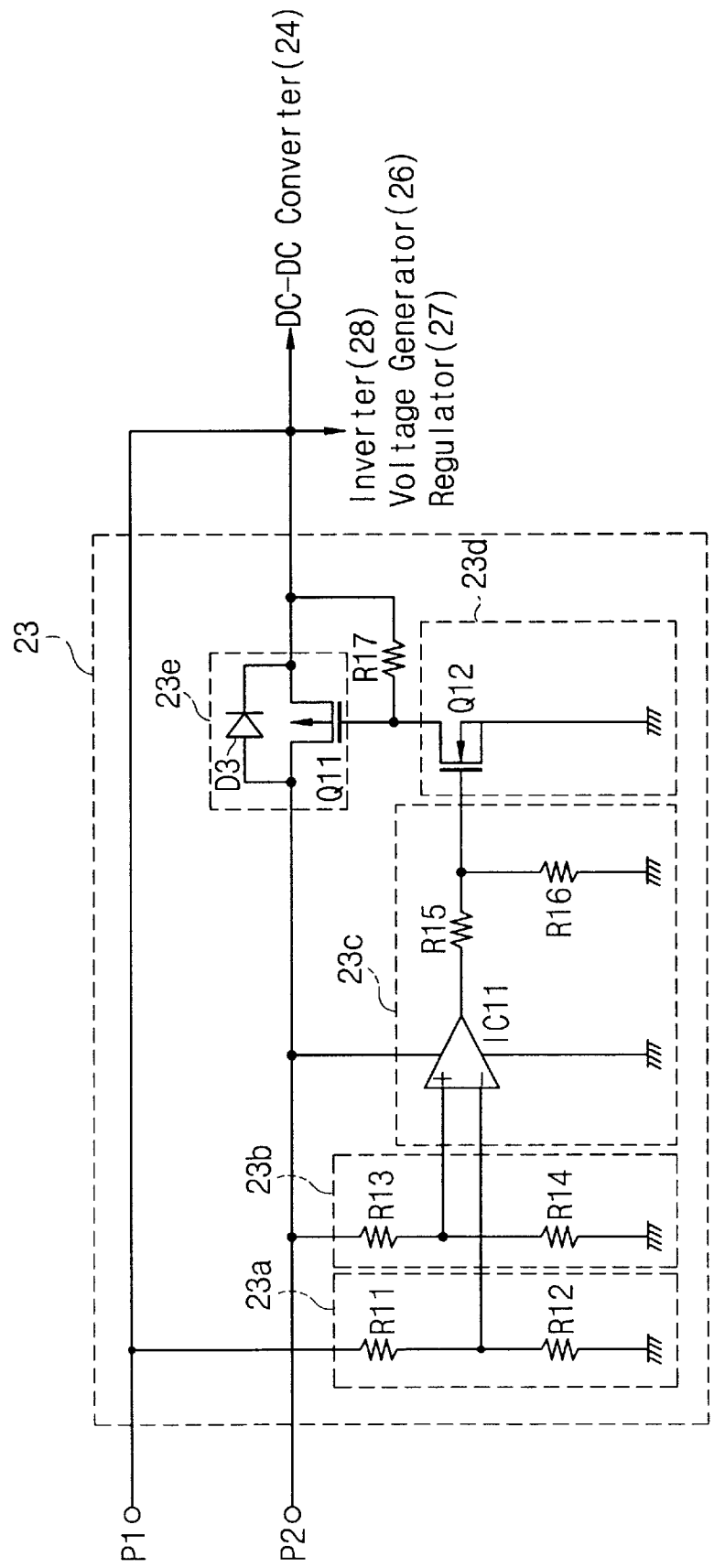
FIG. 8 is a detailed circuit diagram of the DC input selection circuit shown in FIG. 7.

FIG. 8 shows details of the DC input selection circuit 23 of the present invention. In FIG. 8, the DC voltage applied via terminal P1 is divided by resistors R11 and R12 constituting the first voltage divider 23a. The output voltage of the first voltage divider 23a is supplied to the inverting terminal of amplifier IC 11. The other DC voltage applied via terminal P2 is also divided by resistors R13 and R14 constituting the second voltage divider 23b. The output voltage of voltage divider 23b is supplied to the noninverting terminal of amplifier IC11. The amplifier IC11 then compares the two divided voltages with each other. If the voltage applied via terminal P1 is higher than the voltage applied via terminal P2, the amplifier IC11 produces a high level signal. And if not, the amplifier IC11 produces a low level signal. For example, in the case that supply of AC power to the portable computer as well as the docking station is accidentally cut off, the amplifier IC11 produces a high level signal. If the supply of the AC power is not cut off, the amplifier IC11 produces a low level signal.

In the later case, a transistor Q12 constituting the driver 23d is turned off and consequently the power semiconductor transistor (e.g., P-channel field effect transistor) Q11 of the switch 23e is turned off. So, the DC voltage via terminal P1 is supplied to the DC—DC converter 24. In the former case, the transistors Q11 and Q12 are turned on. Consequently, the battery voltage via terminal P2 is supplied to the DC—DC converter 24. At the same time, the battery voltage is also supplied to the DC—DC converter 13 of the docking station via the switch 23e. So, the logic circuit 12 of the docking station can be normally operated regardless of failure of AC power supply.

The switch 23e has a body diode D3. When the DC voltage is supplied to the DC input selection circuit 23 by the AC adapter 30 or SMPS 11, or when voltage at terminal P1 is higher than voltage at terminal P2, no current flows through the body diode D3. Accordingly, the DC voltage from AC adapter 30 or SMPS 11 is supplied to the DC—DC converters 24 and 13.

On the other hand, if the supply of the AC power to AC adapter 30 and SMPS 11 is accidentally cut off, a current path through the body diode D3 is formed. Accordingly, the battery voltage is supplied to the DC—DC converters 24 and 13 through the body diode D3. The DC input selection circuit 23 also has a function to detect whether the DC voltage applied via terminal P1 is lowered less than that applied via terminal P2 and to produce the comparison signal for driving the electrical switch 23e. The detecting function of the DC input selection circuit 23 can be achieved by the combination of the first and second voltage divider 23a and 23b, the comparator 23c and the driver 23d, as shown in FIG. 8.

As described above, a power supply apparatus of the invention permits a docking station for use with a portable computer to be normally operated with a battery power from a battery pack of the portable computer even if the supply of AC power to the docking station is accidentally cut off. As a result, the power supply apparatus can prevent data loss from occurring due to the failure of AC power during operation of the docking station.

What is claimed is:

1. A portable computer system, comprising:
   a notebook computer having a battery backup unit stored within; and
   a docking station onto which said notebook computer attaches to, said docking station being powered by said battery backup unit found within said notebook computer when alternating current power to said docking station is cut off.

2. The portable computer system of claim 1, said notebook computer and said docking station being connected to an alternating current power source.

3. The portable computer system of claim 1, said notebook computer and said docking station each contain direct current to direct current converters converting a direct current input into a plurality of direct current outputs at varying voltages.

4. A power supply apparatus for a portable computer system for use with a docking station having a logic circuit for expanding functions of the portable computer, comprising:
   first and second power input terminals placed on a portable computer, for receiving first and second DC (direct current) voltage, respectively;
   a DC input selection circuit placed on the portable computer, for switching between the first and second DC voltages to provide a switched DC voltage to the portable computer as well as the docking station;
   a first power converter placed on a docking station, for converting an AC (alternating current) power voltage into a third DC voltage; and
   a second power converter placed on the docking station and connected with the first power input terminal, for converting either the third DC voltage from the first power converter or the switched DC voltage through the first power input terminal from the DC input selection circuit into plural levels of DC voltages necessary for the logic circuit of the docking station, the docking station being operated from the second power converter even though supply of AC power to the docking station is cut off.

5. The power supply apparatus of claim 4, wherein said second DC power source comprises a battery voltage from a battery pack.

6. The power supply apparatus of claim 4, wherein said DC input selection circuit comprises a switch for switching the second DC voltage to the portable computer as well as to the docking station in response to a switch driving signal, a first voltage divider for dividing either the first DC voltage from the first power input terminal or the third DC voltage from the first power converter to generate a first divided voltage, a second voltage divider for dividing the second DC voltage from the second power input terminal to generate a second divided voltage, a comparator for comparing the first divided voltage with the second divided voltage to generate a comparison signal, and a driver for generating the switch driving signal in response to the comparison signal.

7. The power supply apparatus of claim 6, wherein the switched DC voltage from the DC input selection circuit is applied to a third power converter which is placed on the portable computer and which is composed of a DC—DC converter for generating a multi-level voltage.

8. The power supply apparatus of claim 6, wherein each of the first and second voltage dividers comprises two resistors which are connected in series with each other.

9. The power supply apparatus of claim 6, wherein the comparator comprises an operational amplifier.

10. The power supply apparatus of claim 6, wherein the switch is an electrical switch.

11. The power supply apparatus of claim 10, wherein the electrical switch comprises a transistor having first and second terminals connected with the second power input terminal and the DC—DC converter, respectively, and a control terminal for receiving the comparison signal from the comparator, and a diode connected between the first and second terminals of the transistor.

12. The power supply apparatus of claim 11, wherein the transistor comprises a P-channel FET (field effect transistor).

13. A power supply apparatus for a portable computer system for use with a docking station having a logic circuit for expanding functions of the portable computer, comprising:
   a DC input selection circuit placed on a portable computer, for switching between a first DC (direct current) voltage from a docking station side and a second DC voltage from a battery pack to provide a switched voltage to the portable computer, wherein the DC input selection circuit provides the switched voltage to the docking station when supply of AC (alternating current) power is cut off.

14. A DC (direct current) input selection circuit, which has a first power input terminal for receiving a first DC voltage from either an AC (alternating current) adapter or a converter placed on a docking station and a second power input terminal for receiving a second DC voltage from a battery pack, for switching between the first and second DC voltages so as to provide a switched voltage to a DC—DC converter placed on a portable computer side, comprising:

a a switch connected between the second power input terminal and the DC—DC converter, for switching the second DC voltage to the DC—DC converter in response to a switch driving signal;
   a first voltage divider for dividing the first DC voltage to generate a first divided voltage;
   a second voltage divider for dividing the second DC voltage to generate a second divided voltage;
   a comparator for comparing the first divided voltage with the second divided voltage to generate a comparison signal; and
   a driver for generating the switch driving signal in response to the comparison signal, whereby the second DC voltage is applied directly to the converter of the docking station as well as the portable computer when no DC voltage is generated from the AC adapter.

15. The input selection circuit of claim 14, wherein the DC—DC converter converts the second DC voltage into different levels of voltages.

16. The input selection circuit of claim 14, wherein each of the first and second voltage dividers comprises two resistors which are connected in series with each other.

17. The input selection circuit of claim 14, wherein the comparator comprises an operational amplifier.

18. The input selection circuit of claim 14, wherein the switch is an electrical switch.

19. The input selection circuit of claim 18, wherein the electrical switch comprises a transistor having first and second terminals connected with the second power input terminal and the DC—DC converter, respectively, and a control terminal for receiving the comparison signal from the comparator, and a diode connected between the first and second terminals of the transistor.

20. A DC (direct current) input selection circuit, which has a first power input terminal for receiving a first DC voltage from either an AC (alternating current) adapter or a converter placed on a docking station and a second power input terminal for receiving a second DC voltage from a battery pack, for switching between the first and second DC voltages so as to provide a switched voltage to a DC—DC converter placed on a portable computer side, comprising:

a switch connected between the second power input terminal and the DC—DC converter, for switching the second DC voltage to the DC—DC converter in response to a switch driving signal; and
   a detector for detecting whether the first DC voltage of the first power input terminal is lowered less than the second DC voltage of the second power input terminal to generate the switch driving signal.

21. The DC input selection circuit of claim 20, wherein the detector comprises a first voltage divider for dividing the first DC voltage from the first power input terminal to generate a first divided voltage, a second voltage divider for dividing the second DC voltage from the second power input terminal to generate a second divided voltage, a comparator for comparing the first divided voltage with the second divided voltage to generate the switch driving signal, and a driver for driving the switch in response to the switch driving signal.

* * * * *